United States Patent
Neville

(10) Patent No.: US 11,542,435 B2
(45) Date of Patent: Jan. 3, 2023

(54) SYSTEM AND METHOD FOR PYROLYSIS

(71) Applicant: WF RECYCLE-TECH LIMITED, Surrey (GB)

(72) Inventor: Paul Neville, Hampshire (GB)

(73) Assignee: WF RECYCLE-TECH LIMITED, Surrey (GB)

( * ) Notice: Subject to any disclaimer, the term of this patent is extended or adjusted under 35 U.S.C. 154(b) by 0 days.

(21) Appl. No.: 17/252,060

(22) PCT Filed: Jun. 19, 2019

(86) PCT No.: PCT/GB2019/051724
§ 371 (c)(1),
(2) Date: Dec. 14, 2020

(87) PCT Pub. No.: WO2019/243818
PCT Pub. Date: Dec. 26, 2019

(65) Prior Publication Data
US 2021/0253954 A1    Aug. 19, 2021

(30) Foreign Application Priority Data

Jun. 19, 2018  (GB) .................................... 1810028
Jun. 19, 2018  (GB) .................................... 1810029
(Continued)

(51) Int. Cl.
C10B 47/44    (2006.01)
B65G 33/14    (2006.01)
(Continued)

(52) U.S. Cl.
CPC .............. *C10B 47/44* (2013.01); *B65G 33/14* (2013.01); *B65G 43/10* (2013.01); *C10B 7/10* (2013.01);
(Continued)

(58) Field of Classification Search
CPC ................................ C10B 47/44; C10B 53/02
See application file for complete search history.

(56) References Cited

U.S. PATENT DOCUMENTS 4,308,103 A    12/1981  Rotter
5,057,189 A    10/1991  Apffel
(Continued)

FOREIGN PATENT DOCUMENTS

WO    2018/102884 A1    6/2018

OTHER PUBLICATIONS

Patil, Hemlata & Tiwari, Roshan & Repka, Michael. (2015). Encapsulation via Hot-Melt Extrusion. URL: https://www.researchgate.net/publication/284578712_Encapsulation_via_Hot-Melt_Extrusion.*

*Primary Examiner* — Jonathan Luke Pilcher
(74) *Attorney, Agent, or Firm* — Young Basile Hanlon & MacFarlane, P.C.

(57) ABSTRACT

A system for processing a material includes a pre-processing module configured to receive the material, mechanically stress the received material, and output the mechanically stressed material. The system also includes a pyrolysis module communicatively coupled to the pre-processing module and downstream of the pre-processing module. The pyrolysis module is configured to receive the mechanically stressed material from the pre-processing module and to perform a pyrolysis process on the received mechanically stressed material, thereby to produce one or more pyrolysis products.

20 Claims, 5 Drawing Sheets

(30) Foreign Application Priority Data

Jun. 19, 2018 (GB) .................................. 1810032
Jun. 19, 2018 (GB) .................................. 1810035

(51) Int. Cl.
*B65G 43/10* (2006.01)
*C10B 7/10* (2006.01)
*C10B 31/04* (2006.01)
*C10B 33/00* (2006.01)
*C10B 41/00* (2006.01)
*C10B 41/02* (2006.01)
*C10B 53/07* (2006.01)
*C10L 9/08* (2006.01)
*C10B 53/02* (2006.01)
*C10B 57/14* (2006.01)

(52) U.S. Cl.
CPC .............. *C10B 31/04* (2013.01); *C10B 33/00* (2013.01); *C10B 41/005* (2013.01); *C10B 41/02* (2013.01); *C10B 53/02* (2013.01); *C10B 53/07* (2013.01); *C10B 57/14* (2013.01); *C10L 9/083* (2013.01); *B65G 2203/0291* (2013.01); *C10L 2290/02* (2013.01); *C10L 2290/06* (2013.01); *C10L 2290/28* (2013.01); *C10L 2290/50* (2013.01); *C10L 2290/562* (2013.01)

(56) References Cited

U.S. PATENT DOCUMENTS

| | | |
|---|---|---|
| 5,806,441 A | 9/1998 | Chung |
| 2002/0117388 A1 | 8/2002 | Denison |
| 2009/0007484 A1* | 1/2009 | Smith .................... C10B 53/02 |
| | | 422/187 |
| 2010/0133085 A1 | 6/2010 | Hutchins et al. |
| 2010/0282590 A1 | 11/2010 | Niu |
| 2014/0008206 A1 | 1/2014 | Miller et al. |
| 2018/0010049 A1* | 1/2018 | Tenore .................... C10B 47/44 |
| 2021/0253953 A1* | 8/2021 | Neville .................. B65G 43/10 |

* cited by examiner

SYSTEM AND METHOD FOR PYROLYSIS

TECHNICAL FIELD

The present disclosure relates to the processing of material, and includes, but is not limited to, the recycling of waste materials, for example the recycling and reclamation of useful materials from vehicle tyres.

BACKGROUND

Many processes produce waste materials, for example solid organic matter. Examples of such solid organic waste material includes plastic materials, polymeric materials, rubber, wood (e.g. wood shavings or saw dust), paper, and cardboard.

Many waste materials are difficult to dispose of. By way of example, the disposal of tyres from cars, tractors, trucks etc. is a serious problem in the modern automotive economy. The disposal of tyres tends to be problematic due to, for example, the large volume produced, the durability of the tyres, and the components in the tyres.

It is generally desirable, when recycling waste materials, to extract as much useful material as possible. For example, finely shredded rubber from scrap tyres (which is often referred to as "crumb rubber") may be combusted and used as fuel. Also, recycled rubber from tyres may be used as a component of various products including, for example, construction materials. It is also known to implement pyrolysis processes on whole or shredded tyres to break down the rubber polymers into smaller molecules.

BRIEF SUMMARY

In a first aspect, the present invention provides a system for processing a material. The system comprises: a pre-processing module configured to receive the material, mechanically stress the received material, heat the received material to less than or equal to 375° C., and output the mechanically stressed and heated material; and a pyrolysis module communicatively coupled to the pre-processing module and downstream of the pre-processing module, the pyrolysis module configured to receive the mechanically stressed and heated material from the pre-processing module and to perform a pyrolysis process on the received mechanically stressed material, thereby to produce one or more pyrolysis products, wherein the pyrolysis process comprises heating the material received from the pre-processing module to greater than or equal to 450° C.

The pre-processing module and the pyrolysis module may be different, separate modules comprising different respective chambers for processing material. The pre-processing module and the pyrolysis module may be independent modules that are configured to be controlled independently of one another. The pre-processing module and the pyrolysis module may be configured to be operated simultaneously such that the pre-processing module may process a received feedstock material at the same time as the pyrolysis module performs the pyrolysis process on material that has been output by the pre-processing module.

The pre-processing module may be configured to heat the received material to between 200° C. and 350° C. The pre-processing module may be configured to heat the received material to between 320° C. and 335° C. or between 320° C. and 330° C. The pyrolysis module may be configured to heat the mechanically stressed material to between 450° C. and 750° C. The pyrolysis module may be configured to heat the mechanically stressed material to between 450° C. and 550° C., or between 500° C. and 550° C., or between 500° C. and 525° C.

The pre-processing module may comprise a pre-processing chamber comprising a first inlet and a first outlet, and a plurality of rotors located within pre-processing chamber. The first inlet may be for the introduction of the material into the pre-processing chamber. The plurality of rotors may be configured to be simultaneously rotated thereby to subject the material within the chamber to mechanical stresses. The first output may be for the expulsion or extrusion of the mechanically stressed material from the pre-processing chamber. The plurality of rotors may comprise at least one pair of rotors arranged at least partly side-by-side.

The pre-processing module may be configured to mechanically stress the received material thereby to increase a temperature of the material owing at least in part to friction. The pre-processing module may further comprise one or more heaters configured to increase a temperature of the material during the mechanical stressing of the material.

The temperature of the material within the pre-processing module may be lower than that at which the material undergoes pyrolysis.

The pyrolysis module may comprise a pyrolysis chamber comprising a second inlet and a second outlet, and one or more heaters operatively coupled to the pyrolysis chamber. The second inlet may be communicatively coupled to pre-processing module and is for the introduction of the mechanically stressed and heated material into the pyrolysis chamber. The one or more heaters may be configured to heat the pyrolysis chamber so as to cause the mechanically stressed and heated material within the pyrolysis chamber to undergo pyrolysis, thereby to produce pyrolysis products. The second output may be for the expulsion of the pyrolysis products from the pyrolysis chamber. The pyrolysis chamber may comprise multiple, independently controllable heating zones. There may be a plurality of the heaters. Each of the heating zones may be heated by a respective one of the plurality of heaters. The pyrolysis chamber may comprise an elongate conduit and a screw located in the elongate conduit. The screw may be for transferring material through the elongate conduit. An outside radial edge of the screw may be engaged so as to form a seal with an internal surface of the elongate conduit. The one or more heaters may comprise at least one annular heater disposed around the pyrolysis chamber.

The pre-processing module may be located above the pyrolysis module such that the mechanically stressed material moves from the pre-processing module to the pyrolysis module by gravity.

A residence time of the received material within the pre-processing module may be less than or equal to 10 secs. A residence time of the mechanically stressed material within the pyrolysis module may be between 5 mins and 25 mins.

The system may further comprise a cooling module configured to receive the one or more pyrolysis products from the pyrolysis module. The cooling module may comprise a first cooler, a storage tank, and a second cooler. The first cooler may be configured to receive one or more pyrolysis products from the pyrolysis module, cool the received one or more pyrolysis products, and provide the cooled one or more pyrolysis products to the storage tank. The storage tank may be configured to store the cooled one or more pyrolysis products received from the first cooler. The second cooler may be configured to receive the cooled one or more pyrolysis products from the storage tank, further cool the received one or more pyrolysis products, and output the further cooled one or more pyrolysis products. The first cooler may comprise a first conduit having a first feeder screw therein. The second cooler may comprise a second conduit having a second feeder screw therein. The first and second feeder screws may be independently controllable.

The material may be a solid organic material. The system may be a recycling system, and the material is a waste material of one or more processes. The material may comprise a material selected from the group of materials consisting of long molecular chain organic matter, tyre material, shredded tyres, crumb rubber, plastic materials, polymeric materials, wood, wood shavings, saw dust, paper, cardboard, a material from which refuse-derived fuel can be obtained, a material from which solid recovered fuel can be obtained, and biological material. The one or more pyrolysis products may comprise a material selected from the group of materials consisting of short molecular chain organic matter, a vapour, and carbon black.

In a further aspect, the present invention provides a method for processing a material. The method comprises: receiving, by a pre-processing module, the material; mechanically stressing and heating, by the pre-processing module, the received material, wherein the received material is heated to less than or equal to 375° C. by the pre-processing module; outputting, by the pre-processing module, the mechanically stressed and heated material; receiving, by a pyrolysis module, from the pre-processing module, the mechanically stressed and heated material; and performing, by the pyrolysis module, a pyrolysis process on the received mechanically stressed and heated material, thereby to produce one or more pyrolysis products, wherein the pyrolysis process comprises heating the material received from the pre-processing module to greater than or equal to 450° C.

In a further aspect, the present invention provides a system for processing a material. The system comprises: a pre-processing module configured to receive the material, mechanically stress the received material, and output the mechanically stressed material; and a pyrolysis module communicatively coupled to the pre-processing module and downstream of the pre-processing module, the pyrolysis module configured to receive the mechanically stressed material from the pre-processing module and to perform a pyrolysis process on the received mechanically stressed material, thereby to produce one or more pyrolysis products.

In any of the above aspects, the pre-processing module may comprise a pre-processing chamber comprising a first inlet and a first outlet, and a plurality of rotors located within pre-processing chamber. The first inlet may be for the introduction of the material into the pre-processing chamber. The plurality of rotors may be configured to be simultaneously rotated thereby to subject the material within the chamber to mechanical stresses. The first output may be for the expulsion or extrusion of the mechanically stressed material from the pre-processing chamber. The plurality of rotors may comprise at least one pair of rotors (e.g. exactly two rotors) arranged at least partly side-by-side. The pre-processing module may be configured to mechanically stress the received material thereby to increase a temperature of the material owing at least in part to friction. The pre-processing module may further comprise one or more heaters configured to increase a temperature of the material during the mechanical stressing of the material. The temperature of the material within the pre-processing module may be lower than that at which the material undergoes pyrolysis.

The pyrolysis module may comprise a pyrolysis chamber comprising a second inlet and a second outlet, and one or more heaters operatively coupled to the pyrolysis chamber. The second inlet may be communicatively coupled to pre-processing module and is for the introduction of the mechanically stressed material into the pyrolysis chamber. The one or more heaters may be configured to heat the pyrolysis chamber so as to cause the mechanically stressed material within the pyrolysis chamber to undergo pyrolysis, thereby to produce pyrolysis products. The second output may be for the expulsion of the pyrolysis products from the pyrolysis chamber. The pyrolysis chamber may comprise multiple, independently controllable heating zones. There may be a plurality of the heaters, and each of the heating zones may be heated by a respective one of the plurality of heaters. The pyrolysis chamber may comprise a screw (which may extend along the entire length of the pyrolysis chamber) for transferring the material through the pyrolysis chamber. The one or more heaters may comprise at least one annular heater disposed around the pyrolysis chamber.

The pre-processing module may be located above the pyrolysis module such that the mechanically stressed material moves from the pre-processing module to the pyrolysis module by gravity.

The pre-processing module may be configured to heat the received material to between 200° C. and 350° C., e.g. between 330° C. and 335° C. A residence time of the received material within the pre-processing module may be less than or equal to 10 secs. The pyrolysis module may be configured to heat the mechanically stressed material to between 450° C. and 750° C., e.g. between 450° C. and 550° C. A residence time of the mechanically stressed material within the pyrolysis module may be between 5 mins and 25 mins.

The system may further comprise a cooling module configured to receive the one or more pyrolysis products from the pyrolysis module, wherein the cooling module comprises: a first cooler; a storage tank; and a second cooler. The first cooler may be configured to receive one or more pyrolysis products from the pyrolysis module, cool the received one or more pyrolysis products, and provide the cooled one or more pyrolysis products to the storage tank. The storage tank may be configured to store the cooled one or more pyrolysis products received from the first cooler. The second cooler may be configured to receive the cooled one or more pyrolysis products from the storage tank, further cool the received one or more pyrolysis products, and output the further cooled one or more pyrolysis products. The first cooler may comprise a first conduit having a first feeder screw therein. The second cooler may comprise a second conduit having a second feeder screw therein. The first and second feeder screws may be independently controllable.

The material may be a solid organic material. The system may be a recycling system. The material may be a waste material of one or more processes. The material may comprise a material selected from the group of materials consisting of long molecular chain organic matter, tyre material, shredded tyres, crumb rubber, plastic materials, polymeric materials, wood, wood shavings, saw dust, paper, cardboard, a material from which refuse-derived fuel can be obtained, a material from which solid recovered fuel can be obtained, and biological material. The one or more pyrolysis products may comprise a material selected from the group of materials consisting of short molecular chain organic matter, a vapour, and carbon black.

In a further aspect, the present invention provides a method for processing a material. The method comprises:

receiving, by a pre-processing module, the material; mechanically stressing, by the pre-processing module, the received material; outputting, by the pre-processing module, the mechanically stressed material; receiving, by a pyrolysis module, from the pre-processing module, the mechanically stressed material; and performing, by the pyrolysis module, a pyrolysis process on the received mechanically stressed material, thereby to produce one or more pyrolysis products.

In a further aspect, the present invention provides a pyrolysis system for performing a pyrolysis process on a received material. The pyrolysis system comprises a pyrolysis chamber configured to receive the material, and a plurality of heaters operatively coupled to the pyrolysis chamber. The plurality of heaters is configured to heat the pyrolysis chamber so as to pyrolyze the material therein, thereby to produce one or more pyrolysis products. Each of the plurality of heaters is configured to heat a respective different portion of the pyrolysis chamber. Each of the plurality of heaters is configured to be controlled independently from each of the other heaters.

In any of the above aspects, the pyrolysis chamber may comprise an elongate conduit. The plurality of heaters may comprise one or more annular heaters, the one or more annular heaters being disposed around a circumference of the elongate conduit.

The pyrolysis chamber may comprise a screw for transferring the material through the pyrolysis chamber. The pyrolysis chamber may comprise an elongate conduit. The screw may located in the elongate conduit. The screw may extend along the entire length of the pyrolysis chamber (i.e. the elongate conduit). An outside radial edge of the screw may be engaged so as to form a seal with an internal surface of the elongate conduit. The plurality of heaters may be spaced apart along a length of the elongate conduit. The plurality of heaters may be contiguous along the length of the elongate conduit.

The plurality of heaters may be controlled based on desired pyrolysis products. The plurality of heaters may be controlled to provide a monotonically increasing heat profile along the pyrolysis chamber.

The pyrolysis chamber may comprise at least two elongate portions arranged substantially parallel to each other. The at least two elongate portions may be located one on top of another. The at least two elongate portions may be configured such that material moves from one elongate portion to another elongate portion by gravity.

The heaters may be configured to heat the pyrolysis chamber to a maximum temperature between 450° C. and 750° C. The heaters may be configured to heat the pyrolysis chamber to a maximum temperature between 450° C. and 550° C. A residence time of the material within the pyrolysis chamber may be between 5 mins and 25 mins, e.g. between 6 mins and 7 mins.

In a further aspect, the present invention provides a pyrolysis system for performing a pyrolysis process on a received material. The pyrolysis system comprises: a pyrolysis chamber configured to receive the material and perform a pyrolysis process on the received material, thereby to produce one or more pyrolysis products. The pyrolysis chamber comprises multiple different zones therein, the temperature within each zone being controllable independently from that of each of the other zones.

In a further aspect, the present invention provides a system for processing a material. The system comprises: a pre-processing module configured to receive the material, mechanically stress the received material, and output the mechanically stressed material; and a pyrolysis system according to any preceding aspect. The pyrolysis system is arranged to receive the mechanically stressed material from the pre-processing module, and to perform a pyrolysis process on the received mechanically stressed material, thereby to produce one or more pyrolysis products.

The pre-processing module may comprise a pre-processing chamber comprising a first inlet and a first outlet, and a plurality of rotors located within pre-processing chamber. The first inlet may be for the introduction of the material into the pre-processing chamber. The plurality of rotors may be configured to be simultaneously rotated thereby to subject the material within the chamber to mechanical stresses. The first output may be for the expulsion or extrusion of the mechanically stressed material from the pre-processing chamber.

In a further aspect, the present invention provides a system comprising a pyrolysis system according to any of the preceding aspects, and a cooling module configured to receive one or more pyrolysis products from the pyrolysis system. The cooling module may comprise a first cooler, a storage tank, and a second cooler. The first cooler may be configured to receive the one or more pyrolysis products from the pyrolysis module, cool the received one or more pyrolysis products, and provide the cooled one or more pyrolysis products to the storage tank. The storage tank may be configured to store the cooled one or more pyrolysis products received from the first cooler. The second cooler may be configured to receive the cooled one or more pyrolysis products from the storage tank, further cool the received one or more pyrolysis products, and output the further cooled one or more pyrolysis products. The first cooler may comprise a first conduit having a first feeder screw therein. The second cooler may comprise a second conduit having a second feeder screw therein. The first and second feeder screws may be independently controllable.

In a further aspect, the present invention provides a method for thermally decomposing a material. The process comprises: receiving, by a pyrolysis chamber, the material; heating, by a plurality of heaters, the pyrolysis chamber, wherein each of the plurality of heaters heats a respective different portion of the pyrolysis chamber; and transferring the material through the heated pyrolysis chamber thereby to pyrolyze the material so as to produce one or more pyrolysis products; wherein each of the plurality of heaters is configured to be controlled independently from each of the other heaters.

The material may be a solid organic material. The method may be a recycling method. The material may be a waste material of one or more processes. The material may comprise a material selected from the group of materials consisting of long molecular chain organic matter, tyre material, shredded tyres, crumb rubber, plastic materials, polymeric materials, wood, wood shavings, saw dust, paper, cardboard, a material from which refuse-derived fuel can be obtained, a material from which solid recovered fuel can be obtained, and biological material. The one or more pyrolysis products may comprise a material selected from the group of materials consisting of short molecular chain organic matter, a vapour, and carbon black.

In a further aspect, the present invention provides carbon black produced by processing an organic material in accordance with the method of any preceding aspects.

DETAILED DESCRIPTION

Figure 1:
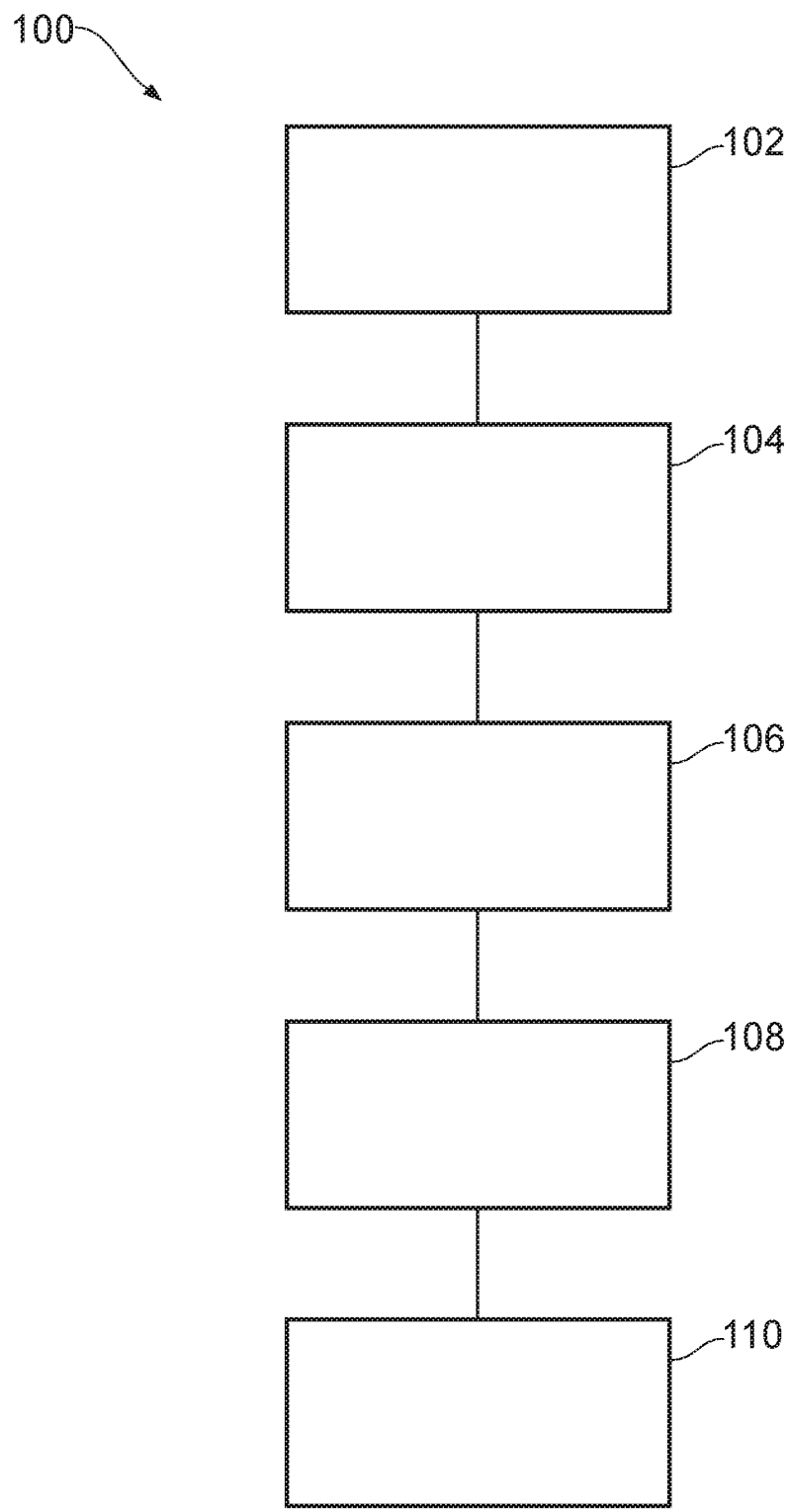
FIG. 1 is a schematic illustration (not to scale) of a system.

FIG. 1 is a schematic illustration (not to scale) of an embodiment of a system 100. In this embodiment, the system 100 is a recycling system for recycling waste materials, such as waste organic matter.

The recycling system 100 comprises an input module 102, a pre-processing module 104, a pyrolysis module 106, a cooling module 108, and a storage module 110.

The input module 102 is described in more detail later below with reference to FIG. 3. Operation of the input module 102 in use is described in more detail later below with reference to FIG. 2. In this embodiment, the input module 102 is configured to receive waste material from a waste material source (not shown). The input module 102 is connected to the pre-processing module 104 such that waste material received by the input module 102 may be transferred to the pre-processing module 104.

The pre-processing module 104 is described in more detail later below with reference to FIG. 4. In this embodiment, the pre-processing module 104 is configured to perform a pre-processing operation on waste material received from the input module 102. The terms "pre-processing", "pre-processing operation", and the like may refer to preliminary processes performed on the waste material prior to the start of a later performed pyrolysis process. Operation of the pre-processing module 104 in use (including the pre-processing operation) is described in more detail later below with reference to FIG. 2. The pre-processing module 104 is connected to the pyrolysis module 106 such that pre-processed waste material output by the pre-processing module 104 may be transferred to the pyrolysis module 106.

The pyrolysis module 106 is described in more detail later below with reference to FIGS. 5 and 6. In this embodiment, the pyrolysis module 106 is configured to perform a pyrolysis process of the pre-processed waste material received from the pre-processing module 104. Operation of the pyrolysis module 106 in use (including the pyrolysis process) is described in more detail later below with reference to FIG. 2. The pyrolysis module 106 is connected to the cooling module 108 such that the output of the pyrolysis module 106 (i.e. the waste material that has undergone pyrolysis) may be transferred to the cooling module 108.

The cooling module 108 is described in more detail later below with reference to FIG. 7. In this embodiment, the cooling module 108 is configured to perform a cooling process on the output received of the pyrolysis module, i.e. the cooling module 108 is configured to cool the pyrolyzed waste material. Operation of the cooling module 108 in use (including the cooling process) is described in more detail later below with reference to FIG. 2. The cooling module 108 is connected to the storage module 110 such that the cooled pyrolyzed waste material may be transferred to the storage module 110.

The storage module 110 is described in more detail later below with reference to FIG. 7. In this embodiment, the storage module 110 is configured to store material received from the cooling module 108.

Figure 2:
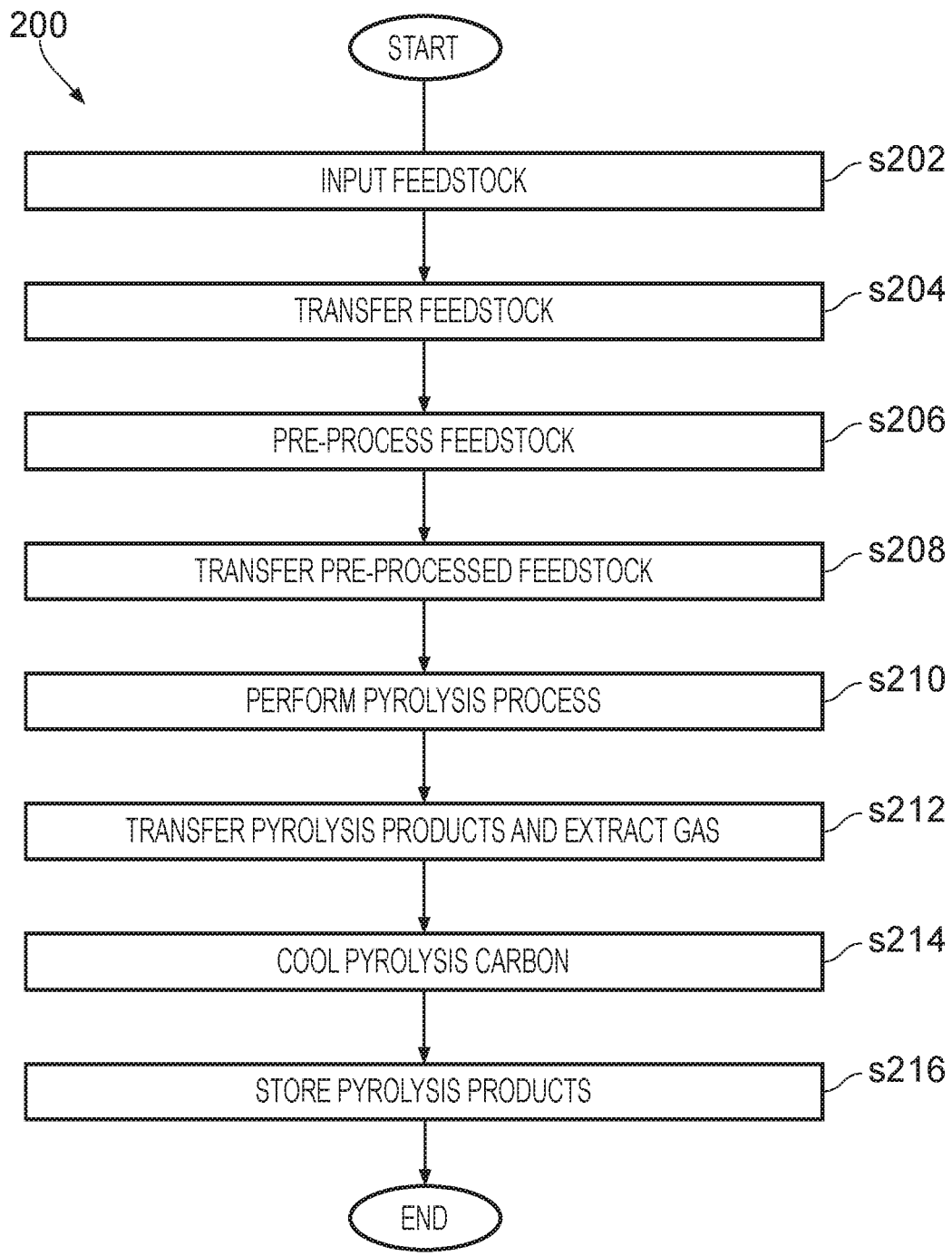
FIG. 2 is a process flow chart showing certain steps of a process performed by the system.

FIG. 2 is a process flow chart showing certain steps of a process 200 performed by the system 100.

It should be noted that certain of the process steps depicted in the flowchart of FIG. 2 and described below may be omitted or such process steps may be performed in differing order to that presented above and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

At step s202, waste material, which in this embodiment is in the form of a feedstock, is input to the system 100. In particular, the input module 102 receives the feedstock from a feedstock source.

At step s204, the input module 102 transfers the received waste material to the pre-processing module 104.

Further details of steps s202 and s204 will now be described with reference to FIG. 3. The remaining steps of the process of FIG. 2 (i.e. steps s206 to s216) will be described later below after the description of FIG. 3.

Figure 3:
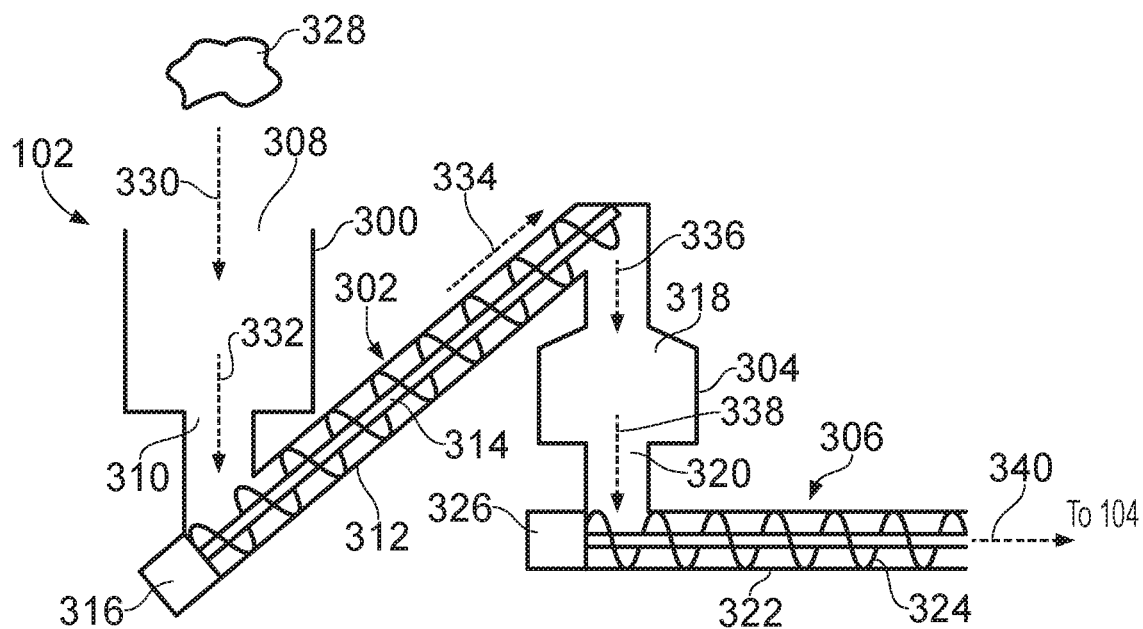
FIG. 3 is a schematic illustration (not to scale) of an input module of the system.

FIG. 3 is a schematic illustration (not to scale) of the input module 102.

In this embodiment, the input module 102 comprises a first feeder tank 300, a first feeder conduit 302, a second feeder tank 304, and a second feeder conduit 306.

The first feeder tank 300 comprises a first opening 308 and a second opening 310. The first opening 308 is located at the top of the first feeder tank 300. The second opening 310 is located at the base of the first feeder tank 300. The first feeder tank 300 communicates, at the second opening 310, with a first end of the first feeder conduit 302.

The first feeder conduit 302 comprises a first tube 312, a first feeder screw 314, and a first motor 316. The first feeder screw 314 is located substantially coaxially within the first tube 312. The first feeder screw 314 is driven by the first motor 316, i.e. the first motor 316 is configured to rotate the first feeder screw 314 about its axis.

The first feeder conduit 302 is communicatively coupled at its first end to the first feeder tank 300. The first feeder conduit 302 is communicatively coupled at its second end, which is opposite to its first end, to the second feeder tank 304.

The second feeder tank 304 comprises a first opening 318 and a second opening 320. The first opening 318 is located at the top of the second feeder tank 304. The second opening 320 is located at the base of the second feeder tank 304. The second feeder tank 304 communicates, at the first opening 318, with the second end of the first feeder conduit 302. The second feeder tank 304 communicates, at the second opening 320, with a first end of the second feeder conduit 306.

The second feeder conduit 306 comprises a second tube 322, a second feeder screw 324, and a second motor 326. The second feeder screw 324 is located substantially coaxially within the second tube 322. The second feeder screw 324 is driven by the second motor 326, i.e. the second motor 326 is configured to rotate the second feeder screw 324 about its axis.

The second feeder conduit 306 is communicatively coupled at its first end to the second feeder tank 304. The second feeder conduit 306 is communicatively coupled at its second end, which is opposite to its first end, to the pre-processing module 104.

In operation, the feedstock 328 is introduced to the first feeder tank 300 via its first opening 308. This is indicated in FIG. 3 by a dotted arrow and the reference numeral 330. In this embodiment, the feedstock 328 comprises tyre material, for example shredded rubber tyres or crumb rubber obtained from tyres. However, in other embodiments, different feedstock, i.e., a different material or material in a different form, may be introduced to the first feeder tank 300, such as a different solid organic material. The feedstock 328 falls into the first feeder tank 300 by gravity, and in this way the feedstock 328 is introduced, through the second opening 310 of the first feeder tank 300, into the first end of the first feeder conduit 302. This is indicated in FIG. 3 by a dotted arrow 332. The first feeder screw 314 then pushes the feedstock 328 along the first tube 312 and out of the second end of the first feeder conduit 302. This is indicated in FIG. 3 by a dotted arrow and the reference numeral 334. The feedstock 328 then falls by gravity into the second feeder tank 304 through the first opening 318. This is indicated in FIG. 3 by a dotted arrow 336. The feedstock 328 is then introduced, by gravity, through the second opening 320 of the second feeder tank 304, into the first end of the second feeder conduit 306. This is indicated in FIG. 3 by a dotted arrow 338. The second feeder screw 324 then pushes the feedstock 328 along the second tube 322 and out of the second end of the second feeder conduit 306, and into the pre-processing module 104. This is indicated in FIG. 3 by a dotted arrow 340.

Preferably, the outside radial edge of the first feeder screw 314 abuts or is engaged so as to form a seal with an internal surface of the first tube 312. Similarly, preferably the outside radial edge of the second feeder screw 324 abuts or is engaged so as to form a seal with an internal surface of the second tube 322. This advantageously tends to reduce or eliminate the flow of substances (e.g. solid material or gas) back along the feeder conduits 302, 306, i.e. in direction opposite to arrows 334 and 340.

In this embodiment, the second feeder conduit 306 is purged to remove oxygen/air (which may be contamination laden), thereby to reduce or eliminate air transfer along the second feeder conduit 306 and into the pre-processing module 104. The second feeder conduit 306 may be, for example, nitrogen purged. In some embodiments, the second feeder tank 304 and/or the first feeder conduit 302 may be purged to remove oxygen/air.

Advantageously, the respective speeds of the first feeder screw 314 and the second feeder screw 324 may be independently controlled, i.e. the respective speeds at which the feedstock 328 is transferred along the first and second feeder conduits 302, 306 may be independently controlled. Also, the respective rates at which the feedstock 328 is introduced into the first feeder conduit 302 and the second feeder conduit 306 (from the first feeder tank 300 and the second feeder tank 304 respectively) may be independently controlled. This tends to provide an increased number of independently controllable variables, i.e. degrees of freedom, compared to conventional feed systems. Advantageously, the feed and/or transfer rates tend to be controllable to provide for continuous, uninterrupted feed of the feedstock 328 into the pre-processing module 104, even when supply of the feedstock 328 into the first feeder tank 300 is discontinuous. This tends to provide for improved efficiency.

Returning now to the description of FIG. 2, after the transfer of the feedstock to the pre-processing module 104 at step s204, at step s206 the pre-processing module 104 pre-processes the received feedstock 328.

Step s206 will now be described in more detail with reference to FIG. 4. The remaining steps of the process of FIG. 2 (i.e. steps s208 to s216) will be described later below after the description of FIG. 4.

Figure 4:
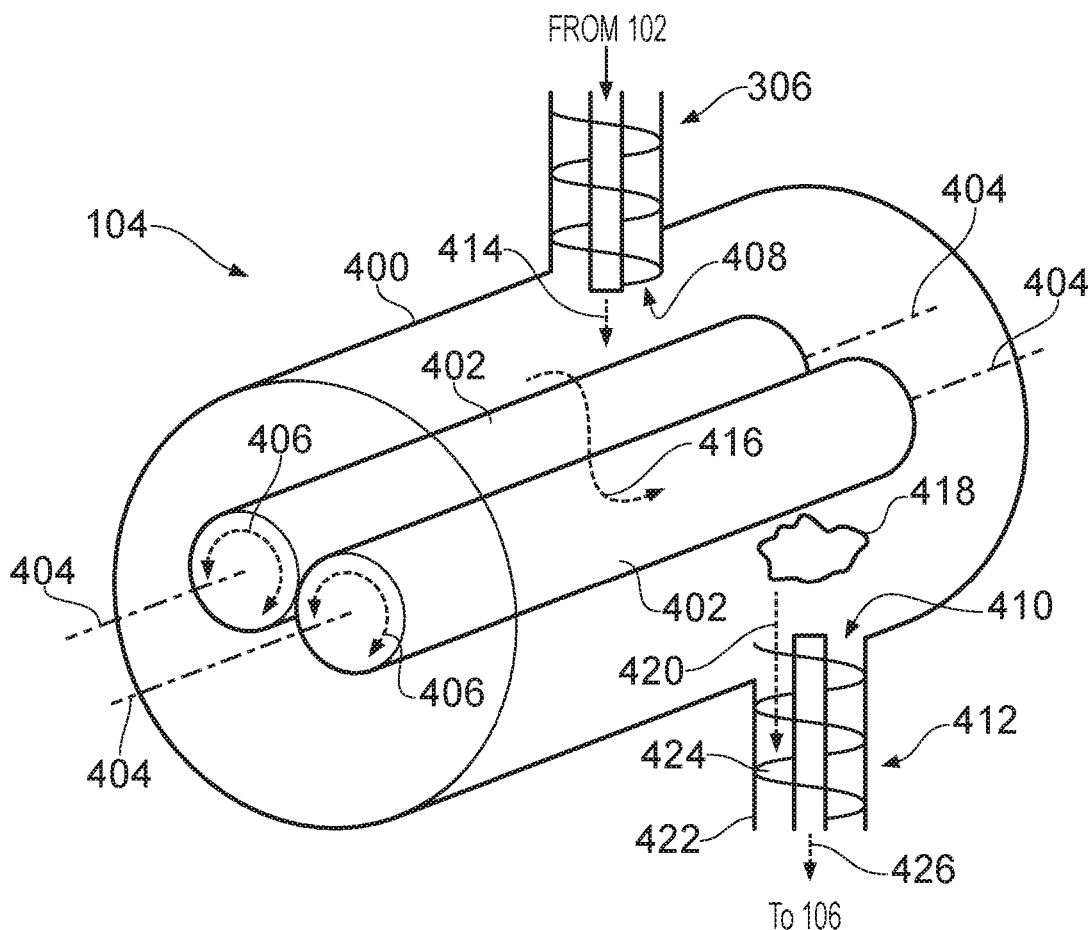
FIG. 4 is a schematic illustration (not to scale) of a pre-processing module of the system.

FIG. 4 is a schematic illustration (not to scale) of the pre-processing module 104.

In this embodiment, the pre-processing module 104 comprises a compounding machine, for example an extrusion and compounding machine. The pre-processing module 104 may be, for example, a commercially available compounding machine.

The pre-processing module 104 comprises a mixing chamber 400 and a plurality of rotors 402 housed within the mixing chamber 400. Although two rotors 402 are depicted in FIG. 4, it will be appreciated by those skilled in the art that the pre-processing module 104 may include any number of rotors, for example more than two. The rotors 402 are elongate members. The rotors 402 are positioned side-by-side, although in other embodiments, the rotors 402 may be arranged in a different manner Although, for ease of depiction, the rotors 402 are depicted in FIG. 4 as substantially cylindrical in shape, it will be appreciated by those skilled in the art that this is not necessarily the case, and the rotors 402 may have any appropriate shape, for example a screw or screw-like shape. The rotors 402 may be kneaders or kneader mixers. The rotors 402 are configured to be rotated (e.g. co-rotated or counter-rotated) about their respective axes 404 within the mixing chamber 400 by a motor (not shown). Example rotation of the rotors is indicated in FIG. 4 by dotted double-headed arrows and the reference numerals 406.

The mixing chamber 400 comprises an inlet 408 and an outlet 410. The inlet 408 is coupled to the second end of the second feeder conduit 306. The outlet 410 is coupled to a first end of a third feeder conduit 412.

In operation, the feedstock 328 is introduced to the mixing chamber 400 through the inlet 408, from second feeder conduit 306. This is indicated in FIG. 4 by a dotted arrow and the reference numeral 414. Within the mixing chamber 400, the feedstock is subjected to mechanical stresses (e.g. is compounded or mixed) by action of the rotating rotors 402 within the mixing chamber 400. This is indicated in FIG. 4 by a dotted arrow and the reference numeral 416. This compounding or mixing may comprise the rotors 402 grinding, crushing, masticating, kneading, pulverising, or in some other way working the feedstock 328. In some embodiments, the mixing chamber 400 and/or the rotors 402 are heated, e.g. by an oil or electric heater, thereby to heat the feedstock 328 during compounding or mixing. For example, the mixing chamber 400 and/or the rotors 402 may be heated to a temperature of 200° C.-300° C., e.g. approximately 250° C. In this embodiment, the compounding or mixing tends to heat up the feedstock 328, for example, by friction between the feedstock 328 and the rotors 402 and/or between feedstock pellets/particulates. For example, during the compounding or mixing process, the temperature of the feedstock may be increased (e.g. via external heating and/or friction) to less than or equal to 400° C., for example, 200° C.-400° C., or more preferably less than or equal to 375° C., or more preferably 200° C.-350° C., or more preferably 300° C.-350° C., or more preferably 320° C.-340° C., or more preferably between 320° C. and 335° C., or more preferably between 320° C. and 330° C. This compounding or mixing of the feedstock 328 tends to cause the feedstock to begin breaking down. For example, a vapour may be released from the feedstock material. The feedstock that has been compounded/mixed by the rotors 402 is referred to as "pre-processed feedstock" 418 as indicated in FIG. 4. The compounding or mixing (and, optionally, heating) of the feedstock 328 is the pre-processing of the feedstock 328 performed prior to the start of the later pyrolysis process, which is described in more detail later below. The pre-processed feedstock 418 may be partially broken-down feedstock and may comprise solid, liquid, and/or gas (e.g. vapour) material. The pre-processed feedstock 418 is transferred (e.g. forced) out of the mixing chamber 400, through the outlet 410, and into a first end of the third feeder conduit 412. This is indicated in FIG. 4 by a dotted arrow and the reference numeral 420.

In this embodiment, the pre-processing process is performed at a temperature that is lower than that at which pyrolysis of the feedstock occurs. The pre-processing process is performed at a temperature that is lower than temperatures that occur in the pyrolysis module 106. The maximum temperature within the pre-processing module 104 (which may be, for example, between 330° C. and 335° C.) is lower than the maximum temperature within the pyrolysis module 106.

In this embodiment, the residence time of material within the pre-processing module 104 is lower than the residence time of material within the pyrolysis module 106. Thus, the pre-processing operation is a shorter duration operation compared to the pyrolysis process. Typically, the residence time of material within the pre-processing module 104 (i.e. the duration of the pre-processing operation) is less than or equal to 60 secs, or more preferably less than or equal to 50 secs, or more preferably less than or equal to 40 secs, or more preferably less than or equal to 30 secs, or more preferably less than or equal to 20 secs, or more preferably less than or equal to 10 secs, or more preferably less than or equal to 5 secs, or more preferably less than or equal to 4 secs, or more preferably less than or equal to 3 secs, for example between about 2 secs and 3 secs.

The pre-processing of the feedstock 328 may result in the pre-processed feedstock 418 being substantially homogenous, for example in cases where the initial feedstock 328 includes multiple different raw materials.

In some embodiments, the pre-processing module 104 comprises an extruder such that the pre-processed feedstock 418 is extruded out of the mixing chamber as an extrudate.

In this embodiment, the mixing chamber 400 is purged to remove oxygen/air (which may be contamination laden). The mixing chamber 400 may be, for example, nitrogen purged.

Returning now to the description of FIG. 2, after the pre-processing of the feedstock by the pre-processing module 104 at step s206, at step s208 the pre-processed feedstock 418 is transferred to the pyrolysis module 106.

In this embodiment, the third feeder conduit 412 transfers the pre-processed feedstock 418 to the pyrolysis module 106. However, in other embodiments, the pre-processed feedstock 418 may be transferred between the pre-processing module 104 and the pyrolysis module 106 in a different way. For example, in some embodiments, the pre-processing module 104 is located directly above (i.e. on top of) the pyrolysis module 106, and the outlet of the pre-processing module 104 is directly connected to an inlet of the pyrolysis module 106 such that the pre-processed feedstock 418 may fall, by gravity, from the pre-processing module 104 into the pyrolysis module 106.

Referring to FIG. 4, in this embodiment, the third feeder conduit 412 comprises a third tube 422, a third feeder screw 424, and a third motor (not shown). The third feeder screw 424 is located substantially coaxially within the third tube 422. The third feeder screw 424 is driven by the third motor, i.e. the third motor is configured to rotate the third feeder screw 424 about its axis. In operation, at step s208, the third feeder screw 424 pushes the pre-processed feedstock 418 along the third tube 422 and out of a second end of the third feeder conduit 412, which is communicatively coupled to the pyrolysis module 106 (the second end of the third feeder conduit 412 being opposite to its first end). This transfer of the pre-processed feedstock 418 is indicated in FIG. 4 by a dotted arrow and the reference numeral 426.

Preferably, the outside radial edge of the third feeder screw 424 abuts or is engaged so as to form a seal with an internal surface of the third tube 422. This advantageously tends to reduce or eliminate the flow of substances (e.g. solid material or gas) back along the third feeder conduit 412.

Returning now to the description of FIG. 2, after the transfer of the feedstock to the pyrolysis module 106 at step s208, at step s210 the pyrolysis module 106 performs a pyrolysis process (i.e. pyrolyzes) the received pre-processed feedstock 418.

Step s210 will now be described in more detail with reference to FIGS. 5 and 6. The remaining steps of the process of FIG. 2 (i.e. steps s214 to s216) will be described later below after the description of FIGS. 5 and 6.

Figure 5:
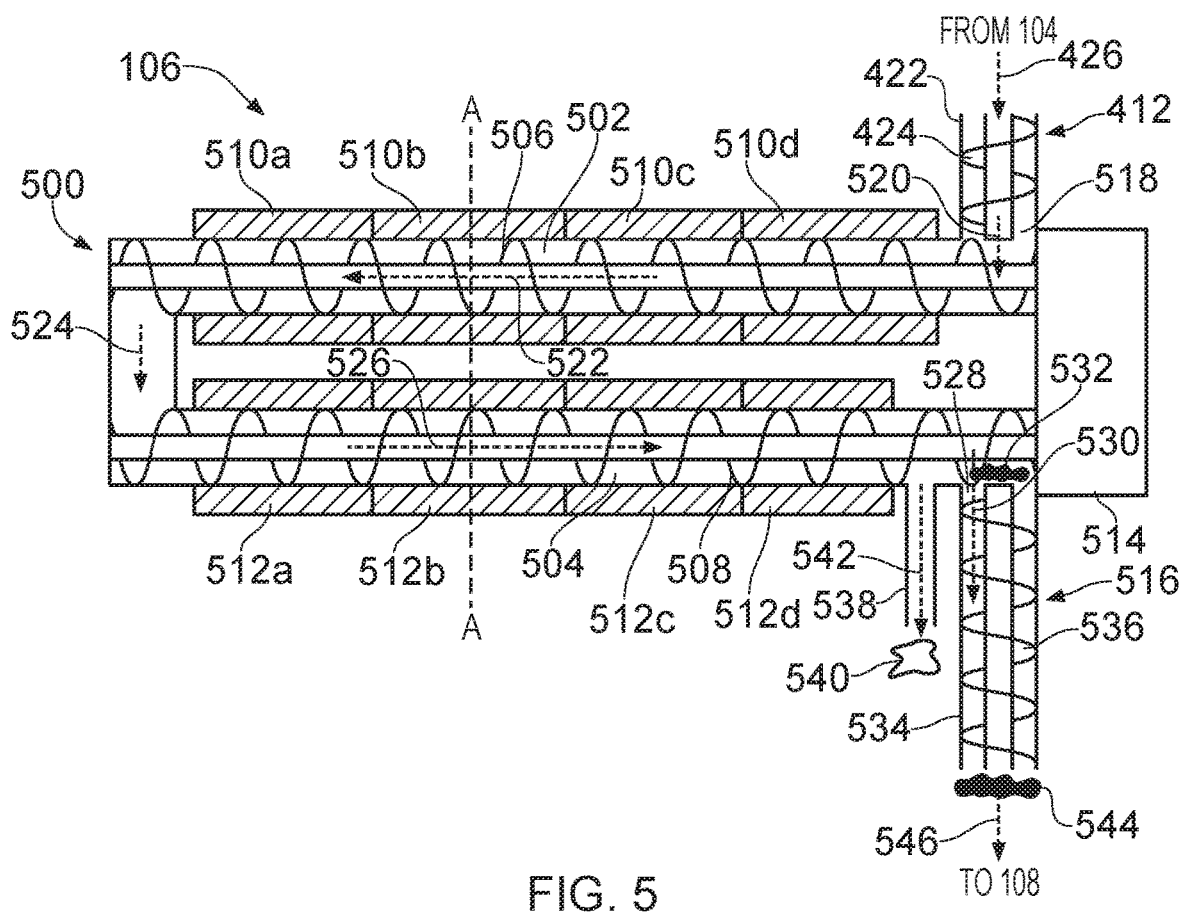
FIG. 5 is a schematic illustration (not to scale) of a pyrolysis module of the system.

FIG. 5 is a schematic illustration (not to scale) of a side view of the pyrolysis module 106.

Figure 6:
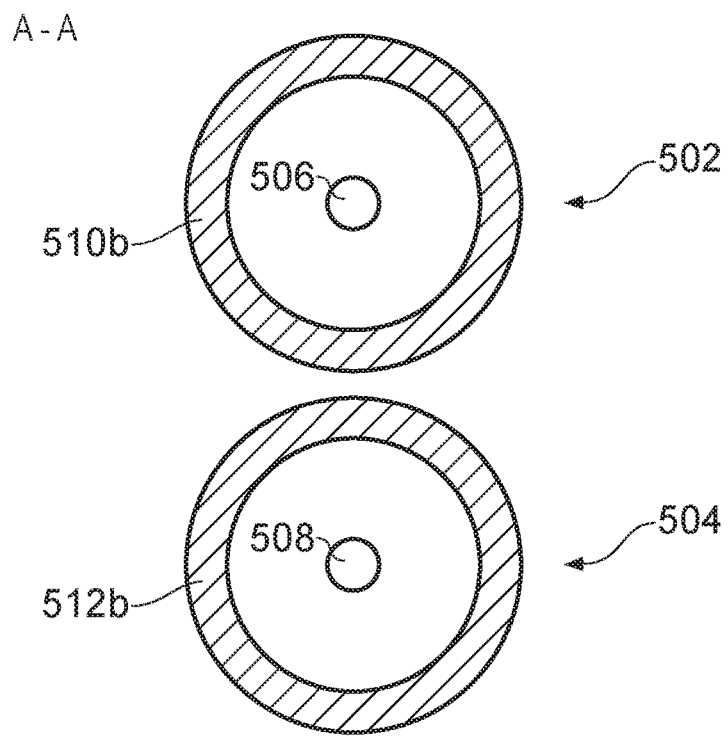
FIG. 6 is a schematic illustration (not to scale) of a cross section through the pyrolysis module.

FIG. 6 is a schematic illustration (not to scale) of a cross-section of the pyrolysis module 106 taken through plane A-A, which is indicated in FIG. 4 by a dotted line.

In this embodiment, the pyrolysis module 106 comprises a pyrolysis chamber 500 comprising a first tubular portion 502 and a second tubular portion 504, a first transfer screw 506, a second transfer screw 508, a first plurality of heaters 510a-d, a second plurality of heaters 512a-d, and a controller 514.

The first tubular portion 502 of the pyrolysis chamber 500 is an elongate tube or pipe in which, in use, pyrolysis occurs. A first end of the first tubular portion 502 is coupled to the second end of the third feeder conduit 412. A second end of the first tubular portion 502, which is opposite to is first end, is communicatively coupled to a first end of the second tubular portion 504.

The first transfer screw 506 is located substantially coaxially within the first tubular portion 502. The first transfer screw 506 is configured to transfer material through the first tubular portion 502. The first transfer screw 506 is driven by a motor (not shown), which may be controlled by the controller 514. Preferably, the outside radial edge of the first transfer screw 506 abuts or is engaged so as to form a seal with an internal surface of the first tubular portion 502. This advantageously tends to reduce or eliminate the flow of substances (e.g. solid material or gas) back along the first tubular portion 502. Also, this advantageously tends to reduce or eliminate the build-up pyrolysis products (such as carbon black) within the first tubular portion 502.

The second tubular portion 504 of the pyrolysis chamber 500 is an elongate tube or pipe in which, in use, pyrolysis occurs. A first end of the second tubular portion 504 is coupled to the second end of the first tubular portion 502. A second end of the second tubular portion 504, which is opposite to is first end, is communicatively coupled to a first end of a fourth feeder conduit 516.

In this embodiment, the first tubular portion 502 and the second tubular portion 504 are substantially parallel. Also, the first tubular portion 502 is located above (i.e. on top of) the second tubular portion 504 such that material may be transferred between the first and second tubular portions (i.e.

from the second end of the first tubular portion 502 to the first end of the second tubular portion 504) by gravity.

The second transfer screw 508 is located substantially coaxially within the second tubular portion 504. The second transfer screw 508 is configured to transfer material through the second tubular portion 504. The second transfer screw 508 is driven by a motor (not shown), which may be controlled by the controller 514. Preferably, the outside radial edge of the second transfer screw 508 abuts or is engaged so as to form a seal with an internal surface of the second tubular portion 504. This advantageously tends to reduce or eliminate the flow of substances (e.g. solid material or gas) back along the second tubular portion 504. Also, this advantageously tends to reduce or eliminate the build-up pyrolysis products (such as carbon black) within the second tubular portion 504.

The first plurality of heaters 510a-d may be, for example, ceramic heaters. Each of the first plurality of heaters 510a-d is an annular heater located around a respective portion of the first tubular portion 502. Each of the first plurality of heaters 510a-d occupies a different respective position along the length of the first tubular portion 502. In this embodiment, the first plurality of heaters 510a-d are positioned contiguously along the length of the first tubular portion 502. However, in other embodiments, the first plurality of heaters 510a-d may be spaced apart along the length of the first tubular portion 502 such that they do not abut each other. Although in FIG. 5 there are four heaters depicted in the first plurality of heaters 510a-d, it will be appreciated by those skilled in the art that the first plurality of heaters 510a-d may include any number of heaters, for example more than four or fewer than four.

The second plurality of heaters 512a-d may be, for example, ceramic heaters. Each of the second plurality of heaters 512a-d is an annular heater located around a respective portion of the second tubular portion 504. Each of the second plurality of heaters 512a-d occupies a different respective position along the length of the second tubular portion 504. In this embodiment, the second plurality of heaters 512a-d are positioned contiguously along the length of the second tubular portion 504. However, in other embodiments, the second plurality of heaters 512a-d may be spaced apart along the length of the second tubular portion 504 such that they do not abut each other. Although in FIG. 5 there are four heaters depicted in the second plurality of heaters 512a-d, it will be appreciated by those skilled in the art that the second plurality of heaters 512a-d may include any number of heaters, for example more than four or fewer than four.

In operation, the pre-processed feedstock 418 is introduced to the pyrolysis chamber 500 through an inlet 518 at the first end of the first tubular portion 502, from third feeder conduit 412. This is indicated in FIG. 5 by a dotted arrow and the reference numeral 520. The pre-processed feedstock 418 is then transferred through the pyrolysis chamber 500 as follows: (i) the first transfer screw 506 pushes the material along the first tubular portion 502 from the first end of the first tubular portion 502 to the second end of the first tubular portion 502 (this is indicated in FIG. 5 by a dotted arrow and the reference numeral 522); (ii) the material then travels, e.g. by gravity, from the second end of the first tubular portion 502 to the first end of the second tubular portion 504 (this is indicated in FIG. 5 by a dotted arrow and the reference numeral 524); (iii) the second transfer screw 508 then pushes the material along the second tubular portion 504 from the first end of the second tubular portion 504 to the second end of the second tubular portion 504 (this is indicated in FIG. 5 by a dotted arrow and the reference numeral 526); the material then exits the pyrolysis chamber 500 through an outlet 528 at the second end of the second tubular portion 504, whereat the material enters fourth feeder conduit 516.

Within the pyrolysis chamber 500, the pre-processed feedstock 418 undergoes pyrolysis. In particular, the pre-processed feedstock 418 is thermally decomposed at elevated temperature in an inert atmosphere. More specifically, in this embodiment, the heaters 510a-d, 512a-d are controlled to heat the tubular portions 502, 504 and the material travelling therethrough (i.e. the pre-processed feedstock 418) such that that material undergoes pyrolysis and is decomposed into one or more "pyrolysis products" 532. In this embodiment, the pyrolysis products 532 comprise volatile products, such as a vapour, and a solid residue enriched in carbon, i.e. "carbon black" or "char". In this embodiment, the pyrolysis products 532 comprise an oil and/or a gas. The pyrolysis products 532 tend to be a result of the residence time within the pyrolysis chamber 500 and the temperature.

In this embodiment, a maximum temperature within the pyrolysis chamber 500 is higher than that within the pre-processing module 104. Thus, pyrolysis does not occur within the pre-processing module 104. In other words, the heaters 510a-d, 512a-d are controlled by the controller 514 to heat the material to a higher temperature than that achieved within the pre-processing module 104.

In this embodiment, the heaters 510a-d, 512a-d are controlled by the controller 514 to gradually heat the material as it is transferred through the pyrolysis chamber 500. For example, the pre-processed feedstock 418 may be heated to a first temperature (e.g. about 320° C.-330° C.) at the first end of the first tubular portion 502, and gradually increased in temperature by successive heaters 510a-d, 512a-d as that material is moved through the first tubular portion 502 and then the second tubular portion 504, until it reaches a second temperature (e.g. about 600° C.) at the second end of the second tubular portion 504, the second temperature being higher than the first temperature. For example, the heaters 510a-d, 512a-d may be controlled such that the temperature within the pyrolysis chamber 500 monotonically increases from the first end of the first tubular portion 502 to the second end of the second tubular portion 502. In some embodiments, a minimum temperature to which the material in the pyrolysis chamber is heated is a temperature selected from the group of temperatures consisting of temperatures between 400° C. and 500° C., e.g. 400° C., 410° C., 420° C., 430° C., 440° C., 450° C., 460° C., 470° C., 480° C., 490° C., or 500° C. In some embodiments, a maximum temperature to which the material in the pyrolysis chamber is a temperature selected from the group of temperatures consisting of temperatures between 500° C.-750° C., e.g. 500° C., 510° C., 520° C., 530° C., 540° C., 550° C., 560° C., 570° C., 580° C., 590° C., 600° C., 650° C., 700° C., or 750° C. Preferably, the material in the pyrolysis chamber is heated to a temperature between 450° C. and 650° C., or more preferably between 450° C. and 600° C., or more preferably between 450° C. and 550° C., e.g. about 525° C.

In this embodiment, the residence time of material within the pyrolysis chamber is higher than the residence time of material within the pre-processing module 104. Thus, the pyrolysis process is a longer duration operation compared to the pre-processing. Typically, the residence time of material within the pyrolysis chamber is greater than or equal to 5 mins Typically, the residence time of material within the pyrolysis chamber is less than or equal to 25 mins. For example, the residence time of material within the pyrolysis chamber may be between 5 mins and 25 mins, or more preferably between 5 mins and 20 mins, for example 5 mins, 6 mins, 7 mins, 8 mins, 9 mins, 10 mins, llmins, 12 mins, 13 mins, 14 mins, 15 mins, 16 mins, 17 mins, 18 mins, 19 mins, or 20 mins. Residence times in the pyrolysis chamber of about 15 mins, 12 mins, 8 mins, or 6 mins, tend to be particularly useful for certain materials. Furthermore, a residence time in the pyrolysis chamber of between 6 mins and 7 mins, e.g. at a temperature between 450° C. and 550° C. tend to be particularly useful for certain materials.

Advantageously, the annular heaters 510*a-d*, 512*a-d* tend to provide for improved, more uniform heating of the material within the pyrolysis chamber 500. Furthermore, the use of screws 506, 508 to transfer material through the pyrolysis chamber 500 agitates the material within the pyrolysis chamber 500. This also tend to provide for improved, more uniform heating of the material within the pyrolysis chamber 500. This improved, more uniform/homogenised heating of the material within the pyrolysis chamber 500 tends to provide improved predictability and control in respect of the products of the pyrolysis process. Surprisingly, the combination of annular heaters 510*a-d*, 512*a-d* and transfer screws 506, 508 is synergistic and provides for improved predictability and control, especially in the processing of solid material.

In this embodiment, each of the heaters 510*a-d*, 512*a-d* are individually and independently controllable by the controller 514. This tends to provide an increased number of independently controllable variables, i.e. degrees of freedom, compared to conventional feed systems. Also, the heaters 510*a-d*, 512*a-d* may be controlled to vary the temperature profile within the pyrolysis chamber 500, i.e. a range of heating gradients/heating functions tend to be achievable. This advantageously tends to allow the pyrolysis process to be adjusted so as to adjust the products produced therefrom. For example, by controlling the heaters 510*a-d*, 512*a-d* it tends to be possible to vary the pyrolysis process from producing heavier oil to producing lighter oils or vice versa.

Advantageously, the respective speeds of the first transfer screw 506 and the second transfer screw 508 may be independently controlled, i.e. the respective speeds at which material is transferred along the first and second tubular portions 502, 504 may be independently controlled. Also, by controlling the speed of the third feeder screw 424 the rate at which the pre-processed feedstock 418 is introduced into the pyrolysis chamber 500 may be independently controlled. This tends to provide an increased number of independently controllable variables, i.e. degrees of freedom, compared to conventional feed systems, which may be controlled so as to tune or adjust the pyrolysis process.

Returning now to the description of FIG. 2, after the pyrolysis process by the pyrolysis module 106 at step s210, at step s212 the pyrolysis products 532 are transferred from pyrolysis module 106.

In this embodiment, gas is extracted from the pyrolysis products 532 at or proximate to the outlet 528. In this embodiment, a gas conduit 538 is communicatively coupled to the pyrolysis chamber 500 at or proximate to the outlet 528 at the second end of the second tubular portion 504. The gas conduit 538 is a tube via which gas and/or vapour (e.g. gas and/or vapour within the pyrolysis products 532) can be extracted from the pyrolysis products 532. At the gas conduit 538, some or all vapour and/or gas products 540 within the pyrolysis products 532 are extracted (i.e. substantially removed or tapped) from the pyrolysis products 532. Such extraction may be performed or facilitated by an extractor (not shown), which may comprise a pump. Extraction of the vapour and/or gas products 540 from the pyrolysis products 532 at the gas conduit 538 is indicated in FIG. 5 by a dotted arrow and the reference numeral 542. The extracted vapour and/or gas products 540 may be used for any appropriate purpose. For example, the vapour and/or gas products 540 may be combusted to heat the pre-processing module 104 and/or the pyrolysis chamber 500. In some embodiments, the vapour and/or gas products 540 may scrubbed, condensed, and/or compressed. After the extraction of the vapour and/or gas products 540, the remaining pyrolysis products 532 (which in this embodiment comprises carbon black 544, or "char") are transferred from the pyrolysis module 106 by the fourth feeder conduit 516.

Referring to FIG. 5, in this embodiment, the fourth feeder conduit 516 comprises a fourth tube 534, a fourth feeder screw 536, and a fourth motor (not shown). The fourth feeder screw 536 is located substantially coaxially within the fourth tube 534. The fourth feeder screw 536 is driven by the fourth motor, i.e. the fourth motor is configured to rotate the fourth feeder screw 536 about its axis. In operation, the fourth feeder screw 536 pushes the pyrolysis products 532 along the fourth tube 534 from the first end of the fourth feeder conduit 516 to the second end of the fourth feeder conduit 516. This is indicated in FIG. 5 by a dotted arrow and the reference numeral 546. The second end of the fourth feeder conduit 516 is communicatively coupled to the cooling module 108. Thus, carbon black 544 is delivered to the cooling module 108.

Preferably, the outside radial edge of the fourth feeder screw 536 abuts or is engaged so as to form a seal with an internal surface of the fourth tube 534. This advantageously tends to reduce or eliminate the flow of substances (e.g. solid material or gas) back along the fourth feeder conduit 516. Also, this advantageously tends to reduce or eliminate the build-up pyrolysis products (such as carbon black) within the fourth tube 534.

Returning now to the description of FIG. 2, after the transfer of the feedstock to the cooling module 108 at step s212, at step s214 the cooling module 108 cools the received carbon black 544, and transfers the cooled carbon black to the storage module 110.

At step s216, the storage module stores the cooled carbon black 544 received from the cooling module 108.

Further details of steps s214 and s216 will now be described with reference to FIG. 7. After the storage of the cooled carbon black 544 at step s216, the processes of FIG. 2 ends.

Figure 7:
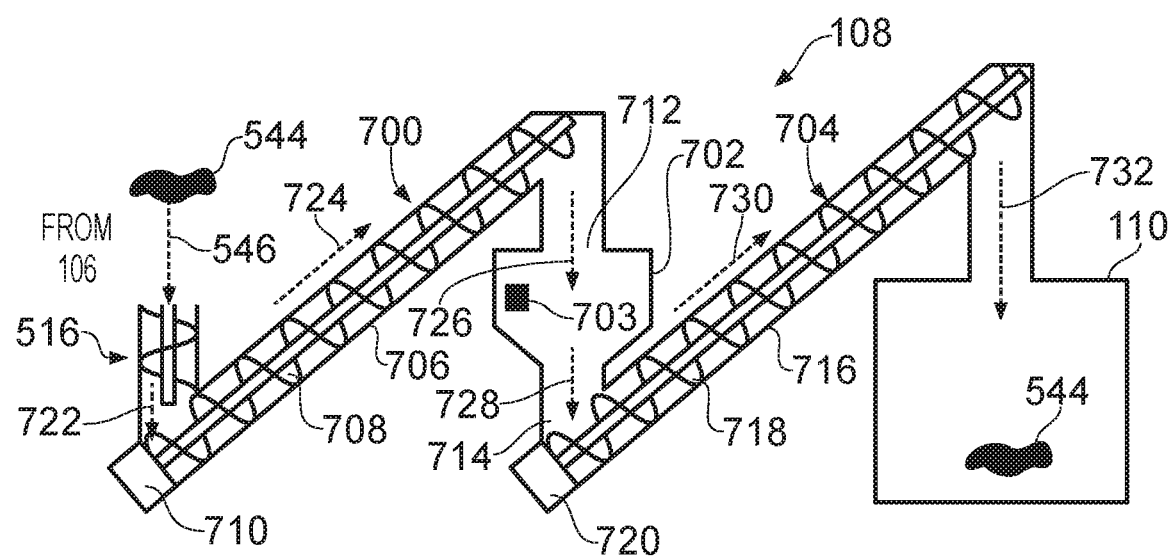
FIG. 7 is a schematic illustration (not to scale) of a cooling module and a storage module of the system.

FIG. 7 is a schematic illustration (not to scale) of the cooling module 108 and the storage module 110.

In this embodiment, the cooling module 108 comprises a fifth feeder conduit 700, a third feeder tank 702, and a sixth feeder conduit 704.

The fifth feeder conduit 700 comprises a fifth tube 706, a fifth feeder screw 708, and a fifth motor 710. The fifth feeder screw 708 is located substantially coaxially within the fifth tube 706. The fifth feeder screw 708 is driven by the fifth motor 710, i.e. the fifth motor 710 is configured to rotate the fifth feeder screw 708 about its axis.

The fifth feeder conduit 700 is communicatively coupled at its first end to the second end of the fourth feeder conduit 516. The fifth feeder conduit 700 is communicatively coupled at its second end, which is opposite to its first end, to the third feeder tank 702.

The third feeder tank 702 comprises a first opening 712 and a second opening 714. The first opening 712 is located at the top of the third feeder tank 702. The second opening 714 is located at the base of the third feeder tank 702. The third feeder tank 702 communicates, at the first opening 712, with the second end of the fifth feeder conduit 700. The third feeder tank 702 communicates, at the second opening 714, with a first end of the sixth feeder conduit 704.

The third feeder tank 702 comprises one or more level sensors 703 configured to measure a level of material contained in the third feeder tank 702.

The sixth feeder conduit 704 comprises a sixth tube 716, a sixth feeder screw 718, and a sixth motor 720. The sixth feeder screw 718 is located substantially coaxially within the sixth tube 716. The sixth feeder screw 718 is driven by the sixth motor 720, i.e. the sixth motor 720 is configured to rotate the sixth feeder screw 718 about its axis.

The sixth feeder conduit 704 is communicatively coupled at its first end to the third feeder tank 702. The sixth feeder conduit 704 is communicatively coupled at its second end, which is opposite to its first end, to the storage module 110.

In this embodiment, the storage module 110 is a tank or bag for storing carbon black. The storage module 110 is removably coupled with the cooling module 108 and, in particular, to the second end of the sixth feeder conduit 704.

In operation, the carbon black 544 is introduced into the first end of the fifth feeder conduit 700. This is indicated in FIG. 7 by a dotted arrow and the reference numeral 722. In this embodiment, the carbon black 544 received by the fifth feeder conduit 700 is relatively hot. For example, the received carbon black may have a temperature of about 450° C.-550° C., e.g. about 500° C. The fifth feeder screw 708 then pushes the carbon black 544 along the fifth tube 706 and out of the second end of the fifth feeder conduit 700. This is indicated in FIG. 7 by a dotted arrow and the reference numeral 724. In this embodiment, as the carbon black 544 is moved along the fifth feeder conduit 700, it is cooled, e.g. to a temperature of 150° C.-250° C., e.g. about 200° C. In particular, in this embodiment, the fifth feeder conduit 700 conducts heat away from the carbon black 544 and then radiates heat to the atmosphere. However, in some embodiments, cooling means (e.g. comprising a heat exchanger, or an air blast cooler) may be incorporated into the fifth feeder conduit 700 to cool the carbon black moving therethrough. After travelling through the fifth feeder conduit 700, the carbon black 544 then falls by gravity into the third feeder tank 702 through the first opening 712. This is indicated in FIG. 7 by a dotted arrow and the reference numeral 726. The carbon black 544 is then introduced, by gravity, through the second opening 714 of the third feeder tank 702, into the first end of the sixth feeder conduit 704. This is indicated in FIG. 7 by a dotted arrow and the reference numeral 728. The sixth feeder screw 718 then pushes the carbon black 544 along the sixth tube 716 and out of the second end of the sixth feeder conduit 704. This is indicated in FIG. 7 by a dotted arrow and the reference numeral 730. In this embodiment, as the carbon black 544 is moved along the sixth feeder conduit 704, it is cooled, e.g. to a temperature of about 50° C. or less. In particular, in this embodiment, the sixth feeder conduit 704 conducts heat away from the carbon black 544 and then radiates heat to the atmosphere. However, in some embodiments, cooling means (e.g. comprising a heat exchanger, or an air blast cooler) may be incorporated into the sixth feeder conduit 704 to cool the carbon black moving therethrough. After travelling through the sixth feeder conduit 704, the carbon black 544 then falls by gravity into the storage module 110. This is indicated in FIG. 7 by a dotted arrow and the reference numeral 732.

In this embodiment, the one or more level sensors 703 located in the third feeder tank 702 measure a level of material contained in the third feeder tank 702.

In this embodiment, operation of one or both of the fifth feeder screw 708 and the sixth feeder screw 718 is controlled dependent on the level measurements taken by the one or more level sensors 703. For example, a feeder screw 708, 718 may be switched on/off dependent on the level measurements, and/or a speed of rotation of a feeder screw 708, 718 may be controlled dependent on the level measurements. Advantageously, this tends to facilitate the automatic and continuous transfer of the carbon black away from the pyrolysis module 106 while at the same time allowing for discontinuous output of the carbon black from sixth feeder conduit 704 into a storage module 110, e.g. so that storage modules can be easily replaced when full without having the stop transfer of carbon black away from the pyrolysis module 106.

For example, operation (i.e. rotation) of the fifth feeder screw 708 may be controlled based on the level measurements taken by the one or more level sensors 703. For example, the fifth feeder screw 708 may be controlled (e.g. switched "on") based on the level measurements to rotate so as to convey the carbon black 544 along the fifth tube 706 and into the third feeder tank 702 when the level of material (e.g. carbon black 544) is below a first threshold level. In some examples, the fifth feeder screw 708 may be controlled (e.g. switched "off") so that transfer of the carbon black 544 along the fifth tube 706 and into the third feeder tank 702 is stopped when the level of material is at or above the first threshold level.

Also for example, operation (i.e. rotation) of the sixth feeder screw 718 is controlled based on the level measurements taken by the one or more level sensors 703. For example, the sixth feeder screw 718 may be controlled (e.g. switched "on") based on the level measurements to rotate so as to convey the carbon black 544 along the sixth tube 716 and into the storage module 110 when the level of material (e.g. carbon black 544) is at or above a second threshold level. The second threshold level may be higher than the first threshold level. In some examples, the sixth feeder screw 718 may be controlled (e.g. switched "off") so that transfer of the carbon black 544 along the sixth tube 716 and into storage module 110 is stopped when the level of material is below the second threshold level.

Preferably, the outside radial edge of the fifth feeder screw 708 abuts or is engaged so as to form a seal with an internal surface of the fifth tube 706. Similarly, preferably the outside radial edge of the sixth feeder screw 718 abuts or is engaged so as to form a seal with an internal surface of the sixth tube 716. This advantageously tends to reduce or eliminate the build-up pyrolysis products (such as carbon black) within the tubes 706, 716.

Advantageously, the respective speeds of the fifth feeder screw 708 and the sixth feeder screw 718 may be independently controlled, i.e. the respective speeds at which the carbon black 544 is transferred along the fifth and sixth feeder conduits 700, 704 may be independently controlled. Also, the rate at which the carbon black 544 is introduced into the fifth feeder conduit 700 may be independently controlled. This tends to provide an increased number of independently controllable variables, i.e. degrees of freedom, compared to conventional feed systems. Advantageously, these feed and/or transfer rates tend to be controllable to allow for continuous, uninterrupted use of the pyrolysis module 106 (and also of the pre-processing module 104). For example, when the storage module 110 is full of carbon black 544, the sixth feeder screw 718 may be stopped (thereby stopping more carbon black 544 from entering the storage module 110). The storage module 110 may then be detached from the sixth feeder conduit 704 and replaced with a new, empty storage module 110. The sixth feeder screw 718 may then be restarted to begin filling the empty storage module. While the sixth feeder screw 718 is stopped, the fifth feeder screw 708 may remain operating (i.e. rotating), thereby transporting carbon black 544 away from the pyrolysis module 106 and into the third feeder tank 702. Thus, even when the storage module 110 is being changed/emptied, the pyrolysis module 106 may remain operational and producing pyrolysis products 532. This tends to provide for improved efficiency. Also, the use of valves etc., which may become blocked, tends to be avoided.

The produced carbon black 544 may be used for any appropriate purpose, for example, as a colourant, in steal production, as a fuel, or in the manufacture of new tyres.

Thus, a recycling system for recycling waste materials is provided.

Advantageously, the products (e.g. gas, vapour, solid material, or liquid material) produced by the above described system and method tend to be of high quality. For example, the above described systems and methods tend to produce a carbon black that is of improved quality compared to conventionally produced carbon black. More specifically, the carbon black produced by the above described systems and methods tends to have a reduced particle size compared to conventionally produced carbon black, thus reducing a need for additional processing (e.g. milling) of the carbon black. The carbon black produced by the above described systems and methods tends to have lower volatility and/or a lower proportion of volatile compounds compared to conventionally produced carbon black. Thus, the carbon black produced tends to be less odorous than conventionally produced carbon black having similar amounts of organic content. The carbon black produced by the above described systems and methods tends to be softer than conventionally produced carbon black. This may facilitate dispersion of the carbon black in a medium. The carbon black produced by the above described systems and methods tends to have more uniform particle size compared to conventionally produced carbon black. The carbon black produced by the above described systems and methods tends to be drier than that conventionally produced thus reducing a need for additional processing (e.g. drying) of the carbon black. The carbon black produced by the above described systems and methods may be used to provide improved colouring additives (e.g. for artist paint), and improved rubber and plastic products. Also, certain products of the pyrolysis process tend to have shorter chain length and/or higher calorific value than those produced conventionally. This tends to be as a result of the two-stage decomposition process, comprising the pre-processing and subsequent pyrolysis process.

Advantageously, the above described system tends to allow for easier regulation and control of temperatures at various stages in the processing of the waste material. This tends to facilitate the adjustment or "tuning" of the process so as to achieve desired output products, i.e. output products having desired properties.

The above described system and method tends to allow for improved material processing rate.

The above described system and method tends to provide for reduced maintenance.

In the above embodiments, gas and vapour products produced during pre-processing and pyrolysis are not extracted until after the material exits the pyrolysis chamber. Advantageously, the presence of the vapour may tend to facilitate in the breaking-down of the remaining substances, e.g. during the pyrolysis process. Furthermore, this tends to provide for improved quality of the hydrocarbons in the vapour extracted downstream of the pyrolysis chamber.

In this embodiment, the feedstock comprises tyre material. However, in other embodiments, the feedstock comprises one or more different types of material instead of or in addition to the tyre material. Preferably, the feedstock comprises organic matter, and more preferably solid organic matter. Examples include, but are not limited to, long molecular chain organic matter, plastic materials, polymeric materials, wood (e.g. wood shavings or saw dust), paper, cardboard, materials (e.g. plastics) from which refuse-derived fuel (RDF) can be obtained, materials (e.g. plastics) from which solid recovered fuel (SRF) can be obtained, and biological material (e.g. biological, medical waste).

In the above embodiments, transfer of material through the system is implemented by feeder screws. However, in other embodiments, one or more of the feeder screws can be replaced by a different type of material transportation mechanism, such as a gravity feed.

In the above embodiments, the pyrolysis chamber comprises two parallel tubular portions. Having two portions located one atop the other advantageously tends to reduce the footprint of the pyrolysis module. However, in other embodiments, the pyrolysis chamber may have a different shape and/or configuration. For example, in some embodiments, the pyrolysis chamber comprises only a single elongate chamber. For example, in some embodiments, the pyrolysis chamber comprises more than two substantially parallel tubular portions that are communicatively coupled together. In some embodiments, tubular portions of the pyrolysis chamber may be positions in a different arrangement, for example, side-by-side, as opposed to being positioned on top of one another.

The invention claimed is:

1. A system for processing a material, the system comprising:
    a pre-processing module configured to receive the material, mechanically stress the received material, heat the received material to less than or equal to 375° C., and output the mechanically stressed and heated material; and
    a pyrolysis module communicatively coupled to the pre-processing module and downstream of the pre-processing module, the pyrolysis module configured to receive the mechanically stressed and heated material from the pre-processing module and to perform a pyrolysis process on the received mechanically stressed material, thereby to produce one or more pyrolysis products, wherein the pyrolysis process comprises heating the material received from the pre-processing module to greater than or equal to 450° C., wherein
    the pre-processing module comprises:
        a pre-processing chamber comprising a first inlet and a first outlet; and
        a plurality of rotors located within the pre-processing chamber;
    the plurality of rotors comprises at least one pair of rotors arranged at least partially side-by-side, the rotors of the at least one pair of rotors having substantially parallel axes of rotation;
    the rotors of the at least one pair of rotors are configured to be simultaneously rotated thereby to subject the material within the pre-processing chamber to mechanical stresses;

the first inlet is disposed directly above the at least one pair of rotors and is configured for introduction of the material into the pre-processing chamber by gravity in a direction substantially perpendicular to the substantially parallel axes of rotation; and the first outlet is disposed directly below the at least one pair of rotors and is configured for expulsion of the mechanically stressed material from the pre-processing chamber by gravity in the direction substantially perpendicular to the substantially parallel axes of rotation.

2. The system of claim 1, wherein the pre-processing module and the pyrolysis module are independent modules that are configured to be controlled independently of one another.

3. The system of claim 1, wherein the pre-processing module and the pyrolysis module are configured to be operated simultaneously such that the pre-processing module may process a received feedstock material at the same time as the pyrolysis module performs the pyrolysis process on material that has been output by the pre-processing module.

4. The system of claim 1, wherein the pre-processing module is configured to heat the received material to between 200° C. and 350° C.

5. The system of claim 1, wherein the pyrolysis module is configured to heat the mechanically stressed material to between 450° C. and 750° C.

6. The system of claim 1, wherein the pre-processing module further comprises one or more heaters configured to increase a temperature of the material during mechanical stressing of the material.

7. The system of claim 1, wherein the pyrolysis module comprises:
- a pyrolysis chamber comprising a second inlet and a second outlet; and
- one or more heaters operatively coupled to the pyrolysis chamber, wherein
- the second inlet is communicatively coupled to the pre-processing module and is for introduction of the mechanically stressed and heated material into the pyrolysis chamber;
- the one or more heaters are configured to heat the pyrolysis chamber so as to cause the mechanically stressed and heated material within the pyrolysis chamber to undergo pyrolysis, thereby to produce pyrolysis products; and
- the second outlet is for expulsion of the pyrolysis products from the pyrolysis chamber.

8. The system of claim 7, wherein:
the pyrolysis chamber comprises multiple, independently controllable heating zones;
there are a plurality of the heaters; and
each of the heating zones is heated by a respective one of the plurality of the heaters.

9. The system of claim 7, wherein:
the pyrolysis chamber comprises an elongate conduit and a screw located in the elongate conduit, the screw being for transferring material through the elongate conduit; and
an outside radial edge of the screw is engaged so as to form a seal with an internal surface of the elongate conduit.

10. The system of claim 7, wherein the one or more heaters comprise at least one annular heater disposed around the pyrolysis chamber.

11. The system of claim 7, wherein:
the pyrolysis chamber comprises:
a first conduit comprising:
the second inlet; and
a third outlet; and
a second conduit substantially parallel to the first conduit, the second conduit being disposed below the first conduit, the second conduit comprising:
a third inlet; and
the second outlet; and
the pyrolysis module is configured to:
transfer the material in a first direction along the first conduit from the second inlet to the third outlet;
expel the material from the first conduit via the third outlet by gravity in a direction substantially perpendicular to the first direction;
introduce the material into the second conduit via the third inlet by gravity in a direction substantially perpendicular to the first direction; and
transfer the material in a second direction along the second conduit from the third inlet to the second outlet, the second direction being opposite to the first direction.

12. The system of claim 1, wherein:
a residence time of the received material within the pre-processing module is less than or equal to 10 secs; and
a residence time of the mechanically stressed material within the pyrolysis module is between 5 mins and 25 mins.

13. The system of claim 1, wherein the system further comprises a cooling module configured to receive the one or more pyrolysis products from the pyrolysis module, wherein the cooling module comprises:
a first cooler;
a storage tank; and
a second cooler; wherein
the first cooler is configured to receive one or more pyrolysis products from the pyrolysis module, cool the received one or more pyrolysis products, and provide the cooled one or more pyrolysis products to the storage tank;
the storage tank is configured to store the cooled one or more pyrolysis products received from the first cooler;
the second cooler is configured to receive the cooled one or more pyrolysis products from the storage tank, further cool the received one or more pyrolysis products, and output the further cooled one or more pyrolysis products.

14. The system of claim 13, wherein:
the first cooler comprises a first conduit having a first feeder screw therein;
the second cooler comprises a second conduit having a second feeder screw therein; and
the first and second feeder screws are independently controllable.

15. The system of claim 13, wherein:
the first cooler comprises a first conduit having a first feeder screw therein;
the second cooler comprises a second conduit having a second feeder screw therein; and
the first and second feeder screws are independently controllable.

16. The system of claim 1, wherein:
the system is a recycling system;
the material is at least one of a solid organic material, a waste material of one or more processes, or a material selected from a group of materials consisting of long molecular chain organic matter, tire material, shredded tires, crumb rubber, plastic materials, polymeric materials, wood, wood shavings, saw dust, paper, cardboard, a material from which refuse-derived fuel can be obtained, a material from which solid recovered fuel can be obtained, and biological material; and the one or more pyrolysis products comprises a material selected from a group of materials consisting of short molecular chain organic matter, a vapor, and carbon black.

17. The system of claim 1, wherein the pre-processing module is located directly above the pyrolysis module such that the mechanically stressed material expelled from the first outlet of the pre-processing module enters the pyrolysis module by gravity.

18. The system of claim 1, wherein the rotors of the at least one pair of rotors are configured to be counter-rotated.

19. The system of claim 1, wherein the pyrolysis module is configured to heat the mechanically stressed material to between 450° C. and 550° C., or between 500° C. and 550° C., or between 500° C. and 525° C.

20. A method for processing a material, the method comprising:

receiving, by a pre-processing module, the material;

mechanically stressing and heating, by the pre-processing module, the received material, wherein the received material is heated to less than or equal to 375° C. by the pre-processing module;

outputting, by the pre-processing module, the mechanically stressed and heated material;

receiving, by a pyrolysis module, from the pre-processing module, the mechanically stressed and heated material; and performing, by the pyrolysis module, a pyrolysis process on the received mechanically stressed and heated material, thereby to produce one or more pyrolysis products, wherein the pyrolysis process comprises heating the material received from the pre-processing module to greater than or equal to 450° C., and wherein:

the pre-processing module comprises:

a pre-processing chamber comprising a first inlet and a first outlet; and a plurality of rotors located within the pre-processing chamber;

the plurality of rotors comprises at least one pair of rotors arranged at least partially side-by-side, the rotors of the at least one pair of rotors having substantially parallel axes of rotation;

the rotors of the at least one pair of rotors are configured to be simultaneously rotated thereby to subject the material within the pre-processing chamber to mechanical stresses;

the first inlet is disposed directly above the at least one pair of rotors and is configured for introduction of the material into the pre-processing chamber by gravity in a direction substantially perpendicular to the substantially parallel axes of rotation; and the first outlet is disposed directly below the at least one pair of rotors and is configured for expulsion of the mechanically stressed material from the pre-processing chamber by gravity in the direction substantially perpendicular to the substantially parallel axes of rotation.

* * * * *